United States Patent
Rafferty et al.

(10) Patent No.: US 12,412,179 B2
(45) Date of Patent: Sep. 9, 2025

(54) PATCHING SECURITY VULNERABILITIES USING MACHINE LEARNING

(71) Applicant: Capital One Services, LLC, McLean, VA (US)

(72) Inventors: Galen Rafferty, Mahomet, IL (US); Austin Walters, Savoy, IL (US); Jeremy Goodsitt, Champaign, IL (US); Anh Truong, Champaign, IL (US); Vincent Pham, Champaign, IL (US); Reza Farivar, Champaign, IL (US); Mark Watson, Urbana, IL (US)

(73) Assignee: Capital One Services, LLC, McLean, VA (US)

( * ) Notice: Subject to any disclaimer, the term of this patent is extended or adjusted under 35 U.S.C. 154(b) by 826 days.

(21) Appl. No.: 17/091,355

(22) Filed: Nov. 6, 2020

(65) Prior Publication Data
US 2022/0148001 A1    May 12, 2022

(51) Int. Cl.
| | |
|---|---|
| G06Q 20/40 | (2012.01) |
| G06F 8/65 | (2018.01) |
| G06F 21/57 | (2013.01) |
| G06N 3/08 | (2023.01) |
| G06Q 10/0635 | (2023.01) |

(52) U.S. Cl.
CPC .......... G06Q 20/4016 (2013.01); G06F 8/65 (2013.01); G06F 21/572 (2013.01); G06F 21/577 (2013.01); G06N 3/08 (2013.01); G06Q 10/0635 (2013.01); *G06F 2221/033* (2013.01)

(58) Field of Classification Search
CPC .......... G06Q 20/4016; G06Q 10/0635; G06F 8/65; G06F 21/572; G06F 21/577; G06F 2221/033; G06N 3/08
USPC .......................................................... 726/25
See application file for complete search history.

(56) References Cited

U.S. PATENT DOCUMENTS

| | | | |
|---|---|---|---|
| 8,019,678 B2 | 9/2011 | Wright et al. | |
| 10,134,041 B2 | 11/2018 | Cowan | |
| 10,395,252 B2 | 8/2019 | Eisen | |
| 10,470,043 B1 | 11/2019 | Cherala et al. | |
| 10,509,997 B1 * | 12/2019 | Gupta | G06N 3/10 |
| 10,810,106 B1 * | 10/2020 | Amit | G06F 11/3604 |
| 11,516,222 B1 * | 11/2022 | Srinivasan | G06F 21/577 |
| 11,706,241 B1 * | 7/2023 | Cross | H04L 63/20 |
| | | | 726/25 |

(Continued)

*Primary Examiner* — Philip J Chea
*Assistant Examiner* — Ghizlane Maazouz
(74) *Attorney, Agent, or Firm* — Sterne, Kessler, Goldstein &Fox P.L.L.C.

(57) ABSTRACT

Disclosed herein are system, method, and computer program product embodiments for process corruption prevention. An embodiment operates by determining security vulnerabilities for an entity and correlation values for the security vulnerabilities by applying completed processed records of the entity to a machine learning model. Each of the correlation values quantifies a relationship strength between a security vulnerability and fraudulent activity. The embodiment further operates by generating a security vulnerability score for the entity using the correlation values and identifying one or more patches for at least one of the security vulnerabilities. The one or more patches may be ranked and the ranking may be revised using a feedback mechanism after the one or more patches are implemented by the entity.

20 Claims, 4 Drawing Sheets

(56) References Cited

U.S. PATENT DOCUMENTS

| | | | |
|---|---|---|---|
| 11,822,915 B2* | 11/2023 | Kwon | G06F 8/658 |
| 12,182,269 B2* | 12/2024 | Babic | G06F 21/57 |
| 2014/0089193 A1* | 3/2014 | Boding | G06Q 20/382 |
| | | | 705/44 |
| 2018/0219899 A1* | 8/2018 | Joy | G06F 11/3433 |
| 2020/0074471 A1 | 3/2020 | Adjaoute | |
| 2021/0273968 A1* | 9/2021 | Shaieb | G06F 8/65 |
| 2021/0352095 A1* | 11/2021 | Cam | G06N 3/006 |
| 2021/0374753 A1* | 12/2021 | Kramme | G06Q 20/4016 |
| 2021/0390187 A1* | 12/2021 | Ahmed | G06N 20/00 |
| 2022/0046031 A1* | 2/2022 | Kaidi | H04L 63/1433 |
| 2022/0083450 A1* | 3/2022 | Geddes | G06F 21/57 |
| 2023/0252157 A1* | 8/2023 | Pieczul | G06F 21/554 |
| | | | 726/25 |

\* cited by examiner

PATCHING SECURITY VULNERABILITIES USING MACHINE LEARNING

BACKGROUND

A security vulnerability may exist in any system. As systems become larger and more complex, there are likely to be more and more security vulnerabilities. Failing to mitigate or patch these security vulnerabilities may result in substantial losses.

BRIEF SUMMARY

One or more embodiments are directed towards a method of process corruption prevention (e.g., transaction fraud prevention). The method includes storing, by one or more computing devices, a plurality of processed records (e.g., completed transaction records) associated with an entity (e.g., a merchant) in a repository. The method also includes determining, by the one or more computing devices, a plurality of security vulnerabilities for the entity and a plurality of correlation values for the plurality of security vulnerabilities by applying the plurality of processed records to a machine learning model, wherein each of the plurality of correlation values quantifies a relationship strength between a security vulnerability and fraudulent activity (e.g., transaction fraud). Then, the method generates a security vulnerability score for the entity using the plurality of correlation values. Additionally, the method identifies a patch for a security vulnerability of the plurality of security vulnerabilities.

One or more additional embodiments are directed towards a system for process corruption prevention (e.g., transaction fraud prevention). The system includes a memory and a computer processor coupled to the memory. The computer processor is configured to store a plurality of processed records (e.g., completed transaction records) associated with an entity (e.g., merchant) in a repository. The computer processor is also configured to determine a plurality of security vulnerabilities for the entity and a plurality of correlation values for the plurality of security vulnerabilities by applying the plurality of processed records to a machine learning model, wherein each of the plurality of correlation values quantifies a relationship strength between a security vulnerability and fraudulent activity (e.g., transaction fraud). Then, the computer processor is configured to generate a security vulnerability score for the entity using the plurality of correlation values. Additionally, the computer processor is configured to identify a patch for a security vulnerability of the plurality of security vulnerabilities.

One or more further embodiments are directed towards a non-transitory computer readable medium having instructions stored thereon that, when executed by at least one computing device, cause the at least one computing device to perform operations. The operations include storing a plurality of processed records (e.g., completed transaction records) associated with an entity in a repository. The operations further include determining a plurality of security vulnerabilities for the entity and a plurality of correlation values for the plurality of security vulnerabilities by applying the plurality of processed records to a machine learning model, wherein each of the plurality of correlation values quantifies a relationship strength between a security vulnerability and fraudulent activity (e.g., transaction fraud). Then, the operations generate a security vulnerability score for the entity using the plurality of correlation values. Additionally, the operations identify a patch for a security vulnerability of the plurality of security vulnerabilities.

BRIEF DESCRIPTION OF THE DRAWINGS/FIGURES

The accompanying drawings, which are incorporated herein and form a part of the specification, illustrate the embodiments of the present disclosure, and together with the description, further serve to explain the principles of the embodiments and enable a person skilled in the pertinent art to make and use the embodiments, individually, or as a combination thereof.

The drawing in which an element first appears is typically indicated by the leftmost digit or digits in the corresponding reference number. In the drawings, like reference numbers may indicate identical or functionally similar elements.

DETAILED DESCRIPTION

Provided herein are system, apparatus, device, method and/or computer program product embodiments, and/or combinations and sub-combinations thereof, for process corruption prevention (e.g., preventing fraudulent transactions). These embodiments include determining security vulnerabilities for an entity (e.g., merchant) and correlation values for the security vulnerabilities using a machine learning model. Specifically, completed transaction records for the entity are applied to the machine learning model to determine the security vulnerabilities and their correlation values. Each of the correlation values quantifies a relationship strength between a security vulnerability and fraudulent activity (e.g., transaction fraud). These embodiments further operate by generating a security vulnerability score for the entity using the correlation values and identifying one or more patches for at least one of the security vulnerabilities. The patches, when implemented by the entity, mitigate one or more of the entity's security vulnerabilities and thus reduce the likelihood of fraudulent transactions. The one or more patches may be ranked and the ranking may be revised using a feedback mechanism after the one or more patches are implemented by the entity.

Figure 1:
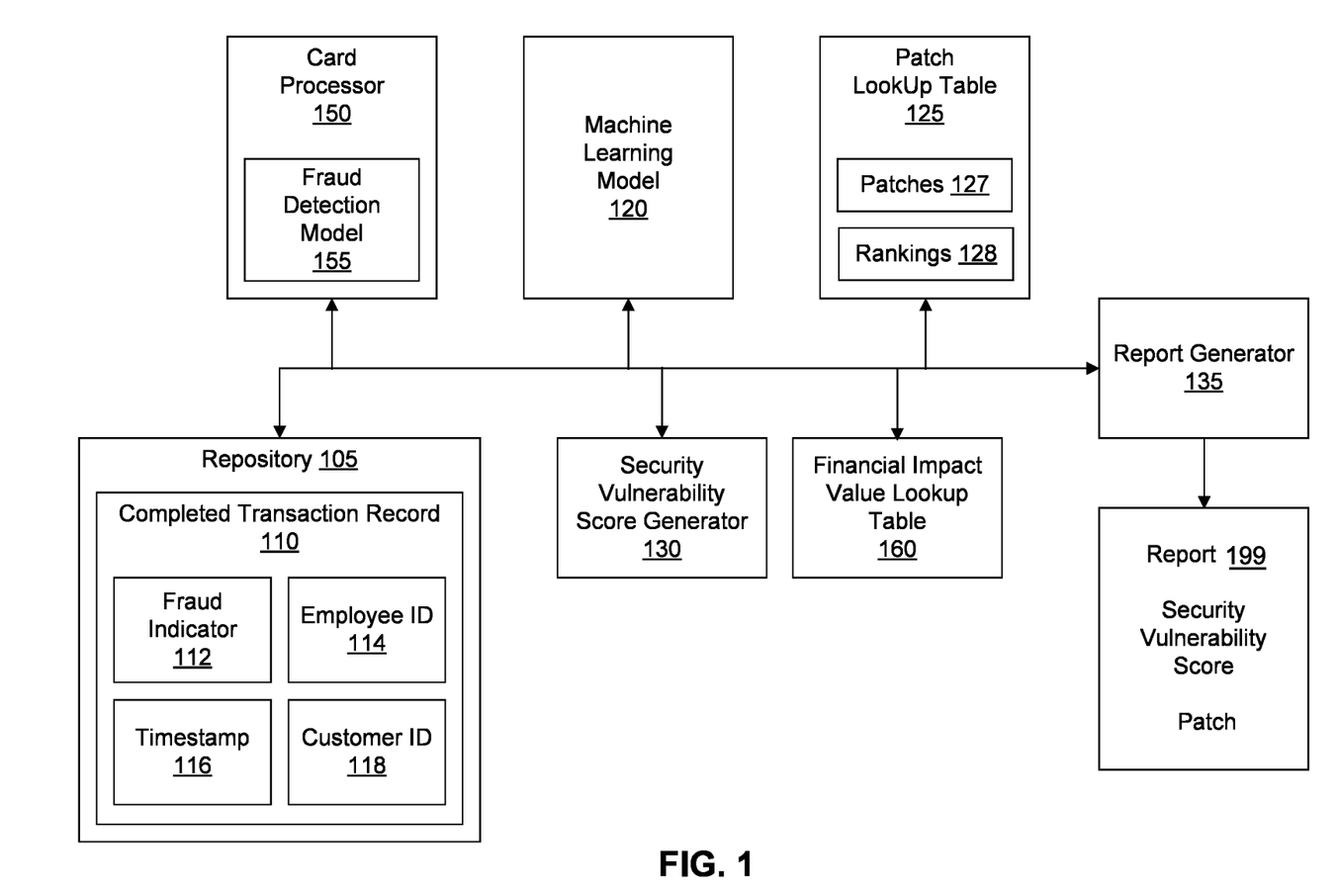
FIG. 1 is a block diagram of a system for process corruption prevention (e.g., fraud prevention) in accordance with one or more embodiments.

FIG. 1 is a block diagram of a system for process corruption prevention (e.g., transaction fraud prevention) in accordance with one or more embodiments. As shown in FIG. 1, the system has multiple components including a repository 105, a machine learning model 120, a patch lookup table 125, a security vulnerability score generator 130, a report generator 135, a financial impact value lookup table 160, and a card processor 150. Each of these components (105, 120, 125, 130, 135, 150, 160) may execute on the same computing device (e.g., server, mainframe, desktop personal computer (PC), tablet PC, smart phone, etc.) or on different computing devices connected by a network having wired and/or wireless segments.

In one or more embodiments, a completed transaction record is an example of a processed record, a merchant is an example of an entity, and an employee is an example of a user. Repository 105 stores completed transaction records for the merchant. Each completed transaction record memorializes a transaction involving the merchant. These transactions may have taken place at any time in the past (e.g., days, weeks, months ago, etc.). As shown in FIG. 1, completed transaction record 110 may include an identifier (ID) of the customer 118 (e.g., name, account number, membership number, full or partial credit card number, etc.) associated with the transaction, an ID of the employee 114 (e.g., name, employee number, etc.) that was the cashier or sales representative for the transaction, and a timestamp 116 with the date and time of the transaction. Although not shown, completed transaction record 110 may also include an ID for the computer server that executed the transaction in the case of an online transaction, a list of the one or more items purchased by the customer during the transaction, an ID for the store location (e.g., if the merchant has more than one brick and mortar location) where the transaction occurred, the lane used by the customer to purchase the products (e.g., if the merchant has more than one lane for checkout), etc.

In one or more embodiments, completed transaction record 110 includes a fraud indicator 112 for the transaction. Fraud indicator 112 may be a flag (e.g., Boolean value) and a set flag may indicate that the completed transaction is confirmed fraudulent or suspected fraudulent. Alternatively, fraud indicator 112 may take on more than two values: one value when the completed transaction is confirmed fraudulent, a different value when the completed transaction is suspected fraudulent, and yet another value when the completed transaction is not suspected of being fraudulent. The classification of these transactions (e.g., fraudulent, suspected fraudulent, no fraud, etc.) may have been determined by processor (e.g., card processor 150), a financial institution, the merchant, or any third-party. As a further alternative, fraud indicator 112 may be a numeric value (e.g., a percentage) indicating a probability that a transaction was fraudulent.

Machine learning model 120 is configured to determine security vulnerabilities for the merchant based on the completed transaction records for the merchant. A security vulnerability is a transaction attribute linked to fraudulent transactions for the merchant (e.g., transactions involving employee fraud, refund fraud, discount abuse, sweethearting, wardrobing, etc.). For example, security vulnerabilities may include one or more customers of the merchant. These customers may be utilizing stolen credit cards to make purchases. Security vulnerabilities may also include one or more employees of the merchant or employee-customer combinations. For example, these employees may be deliberately undercharging customers or even helping customers steal. Security vulnerabilities may also include one or more store locations (e.g., a significant number of fraudulent transactions may take place in an economically disadvantaged neighborhood), one or more time windows (e.g., significant number of fraudulent transactions take place during the night shift), etc. The security vulnerabilities may include a server ID corresponding to the server that processed fraudulent in-person or online transactions.

As a non-limiting example, assuming a customer will randomly choose a lane, and assuming a cashier is randomly assigned a lane every shift, then the number of transactions and/or the revenue from transactions should be similar among all cashiers during a shift. The machine learning model 120 may implement a clustering or classification technique that can identify cashiers falling outside of the norm (e.g., more than one standard deviation below the mean). These cashiers falling outside the norm may be deliberately undercharging customers or even helping customers steal.

Machine learning model 120 is also configured to determine correlation values for security vulnerabilities. Each correlation value quantifies the relationship strength between a security vulnerability and fraudulent activity (e.g., fraudulent transactions) for the merchant. For example, a large correlation value may indicate that the corresponding security vulnerability frequently results in a fraudulent transaction, while a low correlation value may indicate that the security vulnerability rarely results in a fraudulent transaction. The correlation values may be normalized between 0 and 1.

In one or more embodiments, machine learning model 120 is a neural network such as a long short-term memory (LSTM). Other types of neural networks or statistical learning algorithms may alternatively be used for machine learning model 120. The contents of the completed transaction records are applied to machine learning model 120. This may include processing the contents of the completed transaction records into feature vectors for consumption by machine learning model 120. The outputs of machine learning model 120 include the security vulnerabilities and the correlation values for the security vulnerabilities.

In one or more embodiments, a financial impact value is an example of an impact value and an employee is an example of a user. Financial impact value lookup table 160 stores financial impact values for various security vulnerabilities. In one or more embodiments, the financial impact value for a security vulnerability is a revenue amount of the merchant attributable to the security vulnerability. For example, if the security vulnerability is an employee, the financial impact value may be the revenue of the merchant attributable to transactions involving the employee (e.g., where the employee operates as the cashier). If the security vulnerability is a store location, the financial impact value may be the revenue of the merchant attributable to transactions at that store location. If the security vulnerability is a customer-employee pairing, the financial impact value may be the revenue of the merchant attributable to transactions involving both the customer and employee. If the security vulnerability is a time window (e.g., 12:00 to 13:00), the financial impact value may be the revenue of the merchant from transactions occurring during the time window. The financial impact value may be predetermined for certain types of security vulnerabilities, or it may be calculated based on that merchant's relevant transaction records. A security vulnerability may be submitted to financial impact value lookup table 160 and the financial impact value for the security vulnerability may be output in response to the submission.

Patch lookup table 125 stores patches 127 for specific security vulnerabilities (e.g., employee X, customer Y, store location Z) and/or types of security vulnerabilities (e.g., customer security vulnerability, employee security vulnerability, store location vulnerability, timeslot vulnerability, etc.). Additionally or alternatively, patch lookup table 125 may store patches for various combinations of security vulnerabilities. When implemented, a patch is designed to mitigate one or more security vulnerabilities and thus reduce the likelihood of fraudulent activity (e.g., fraudulent transactions) resulting from the security vulnerabilities. For example, if the security vulnerability involves a specific customer, the patch may include enforcing the verification of customer identity at the time of sale and/or banning the customer from the store. As another example, if the security vulnerability involves a specific employee, the patch may include enforcing a requirement that each employee (e.g., cashier) log into his or her point-of-sale (POS) terminal at the start of a shift and/or logout of his or her POS terminal when the shift is over (as opposed to letting the next cashier start utilizing the point-of-sale terminal without logging in and/or one cashier clocking in or clocking out for another cashier). In one or more embodiments, a POS terminal is an example of a user device. A security vulnerability or a combination of security vulnerabilities may be submitted to patch lookup table 125 and one or more patches may be output in response to the submission.

In one or more embodiments, patch lookup table 125 stores multiple patches 127 for a specific security vulnerability or a type of security vulnerability. In such embodiments, the multiple patches are associated with rankings 128 and only the highest ranking patch may be output in response to the submission of a security vulnerability (or combination of security vulnerabilities). The rankings 128 for a set of patches may be revised based on feedback following implementation of the patches (discussed below).

Security vulnerability score generator 130 is configured to generate a security vulnerability score for the merchant. The security vulnerability score for the merchant may be a function of both the financial impact values for the security vulnerabilities of the merchant and the correlation values for the security vulnerabilities. In one or more embodiments, the larger the security vulnerability score, the larger the financial loss the merchant is likely to face due to fraudulent transactions. The security vulnerability score for a merchant may change over time as the merchant implements one or more patches in an attempt to mitigate the security vulnerabilities.

Report generator 135 is configured to issue reports for the merchant. As shown in FIG. 1, report 199 includes the security vulnerability score for the merchant and at least one patch to mitigate the one or more security vulnerabilities resulting in the security vulnerability score. By implementing the one or more patches in report 199, there is likely to be a reduction in fraudulent activity (e.g., fraudulent transactions) for the merchant, and thus a reduction in losses for the merchant. Although not shown in FIG. 1, report 199 may also identify the security vulnerabilities and the correlation values. In some embodiments, report 199 includes the average or median security vulnerability score for all merchants of the same size or merchants selling similar products for the purposes of comparison.

In one or more embodiments, card processor 150 is an example of a processor. Card processor 150 is configured to process card transactions (e.g., credit card, debit card, etc.) for the merchant. In other words, card processor 150 is utilized when a customer is attempting to purchase a product from the merchant using a credit card, debit card, etc. Card processor 150 may utilize fraud detection model 155 to identify fraudulent transactions in real-time. Upon detection or suspicion of a fraudulent transaction, card processor 150 may decline the transaction. Accordingly, if the customer still wishes to purchase the product, the customer might need to use a different card or pay in cash.

In one or more embodiments, card processor 150 may utilize the security vulnerabilities and the correlation values determined by machine learning model 120 to improve its detection model (e.g., fraud detection model 155). Following this improvement, fraud detection model 155 may more accurately identify fraudulent transactions by analyzing transactions for the security vulnerabilities with high correlation values.

Figure 2:
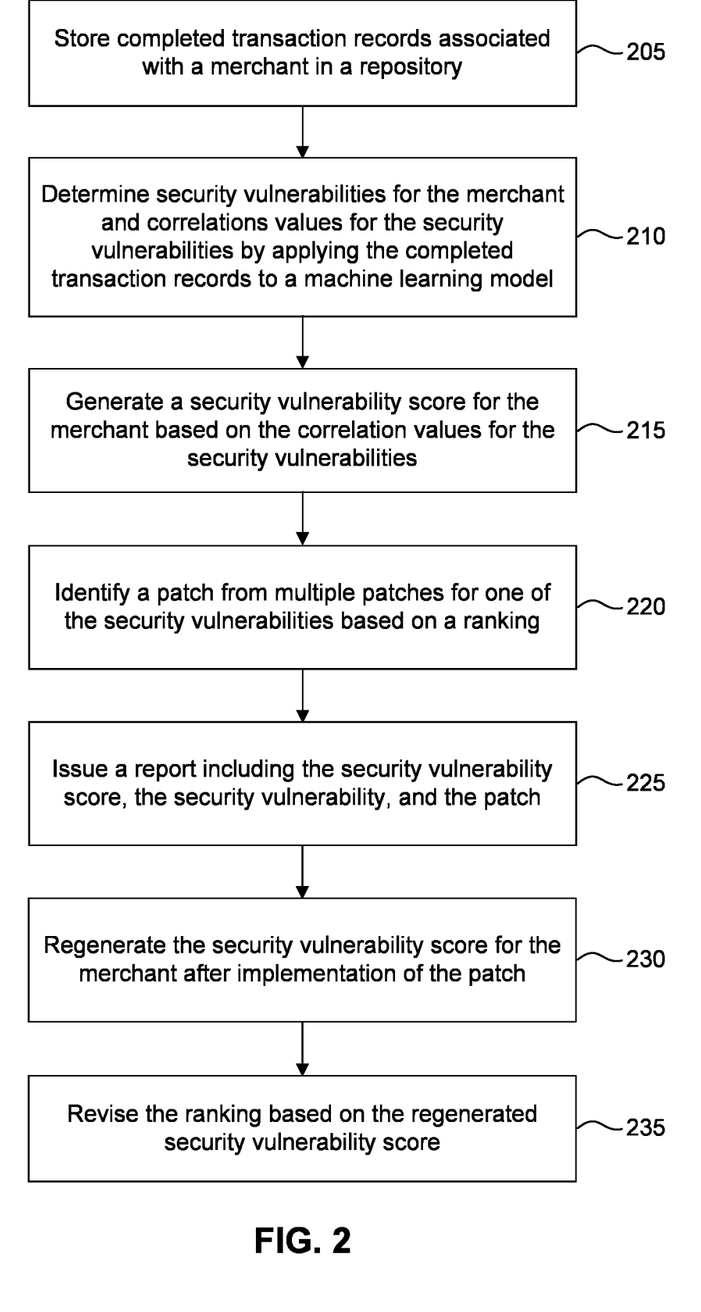
FIG. 2 is a flowchart depicting a method for process corruption prevention (e.g., fraud prevention) in accordance with one or more embodiments.

FIG. 2 is a flowchart depicting a method for process corruption prevention (e.g., transaction fraud prevention) in accordance with one or more embodiments. The method depicted in FIG. 2 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 2, as will be understood by a person of ordinary skill in the art.

The method in FIG. 2 shall be described with reference to FIG. 1. However, the method depicted in FIG. 2 is not limited to that example embodiment. In one or more embodiments, a completed transaction record is an example of a processed record, a merchant is an example of an entity, a financial impact value is an example of an impact value, an employee is an example of a user, a POS terminal is an example of a user device, and a card processor is an example of a processor.

At 205, completed transaction records are stored. For example, the completed transaction records may be stored in repository 105. The completed transaction records memorialize transactions involving a merchant. The transaction records may be obtained directly from the merchant, from sales or inventory software operated by the merchant, from the merchant's card processor, etc. As discussed above, each completed transaction record may include an ID of the customer associated with the transaction, a list of the one or more items purchased by the customer during the transaction, an ID of the employee involved in the transaction, an ID for the store location where the transaction occurred, a timestamp with the date and time of the transaction, an ID for the computer server that executed the transaction in the case of an online transaction, etc. In one or more embodiments, the completed transaction record also includes a fraud indicator for the transaction.

At 210, security vulnerabilities for the merchant and correlation values for these security vulnerabilities are determined. Each of the security vulnerabilities is linked to fraudulent transactions for the merchant. For example, the security vulnerabilities may include one or more customers of the merchant, one or more employees of the merchant, one or more employee-customer combinations, one or more store locations, one or more time windows, etc. Each correlation value quantifies the relationship strength between a security vulnerability and fraudulent transactions for the merchant. For example, a large correlation value may indicate that the corresponding security vulnerability frequently results in a fraudulent transaction, while a low correlation value may indicate that the security vulnerability rarely results in a fraudulent transaction. The correlation values may be normalized between 0 and 1.

In one or more embodiments, security vulnerabilities and the corresponding correlation values are determined using machine learning model 120. The content of completed transaction records (e.g., customer ID, employee ID, fraud indicator, timestamp, etc.) are processed into feature vectors for consumption by machine learning model 120. In other words, the contents of the completed transaction records are inputs to machine learning model 120 (e.g., the fraud indicator is an input to the machine learning model). The output of machine learning model 120 is the security vulnerabilities and the correlation values. In other words, the completed transaction records are effectively applied to machine learning model 120 to determine the security vulnerabilities and correlation values. As discussed above, machine learning model 120 may be a long short-term memory neural network, another type of neural network, or another type of statistical analysis machine learning model.

At 215, a security vulnerability score is generated for the merchant. The security vulnerability score may be generated by security vulnerability score generator 130. In one or more embodiments, the security vulnerability score is generated by obtaining a financial impact value for each of the determined security vulnerabilities and then calculating a weighted average of the financial impact values, using the correlation values as the weights. For example, if $C1, C2, \ldots, CN$ are the correlation values for security vulnerabilities $V1, V2, \ldots, VN$, and $F1, F2, \ldots, FN$ are the financial impact values for security vulnerabilities $V1, V2, \ldots, VN$, the security vulnerability score may be calculated as: $(C1*F1+C2*F2+ \ldots +CN*FN)/N$. Accordingly, in some embodiments, the larger the security vulnerability score, the greater the losses the merchant is likely to experience due to future fraudulent transactions. As discussed above, the financial impact value for a security vulnerability may be a revenue amount of the merchant attributable to the security vulnerability.

In one or more embodiments, these financial impact values are stored in financial impact value lookup table 160. Security vulnerability score generator 130 searches financial impact value lookup table 160 based on a security vulnerability, and the corresponding financial impact value for the security vulnerability is output from the financial impact value lookup table 160 (i.e., the result of the search).

At 220, a patch is identified based on one or more of the security vulnerabilities. When implemented, the patch is designed to mitigate one or more security vulnerabilities and thus prevent (e.g., reduce the likelihood of) fraudulent transactions resulting from the security vulnerabilities. Example patches may include verifying customer identity at the time of sale and/or enforcing the verification of customer identity at the time of sale, enforcing a requirement that each employee (e.g., cashier) logout of his or her point-of-sale terminal when their shift is over (as opposed to letting the next cashier start utilizing the point-of-sale terminal without logging in), banning one or more customers from the store, etc.

The patch may be identified by searching patch lookup table 125 using the top security vulnerability (e.g., the security vulnerability with the largest correlation value) or a combination of security vulnerabilities. The output of patch lookup table 125 (and thus result of the search) is one or more patches to mitigate the one or more security vulnerabilities.

In one or more embodiments, for a specific security vulnerability (e.g., employee X, customer Y, store location Z) and/or for a type of security vulnerability (e.g., customer security vulnerability, employee security vulnerability, store location vulnerability, time window vulnerability, etc.), patch lookup table 125 may store multiple patches and the patches may be ranked. Patch lookup table 125 may output all of the patches in response to the search for the specific security vulnerability or type of security vulnerability. Alternatively, patch lookup table 125 may output only the highest ranking patch or top M highest ranking patches for the specific security vulnerability or type of security vulnerability.

At 225, a report is issued. The report may be issued by report generator 135. The report may include one or more of the determined security vulnerabilities, the correlation values, the security vulnerability score for the merchant, and the one or more identified patches. The report may also include, as a reference, the average or median security vulnerability score for other merchants that are similar to the merchant receiving the report (e.g., other merchants of the same size, other merchants selling the same type of products, other merchants in the same city or state, etc.). The merchant may implement one or more of the patches identified in the report in an attempt to prevent (e.g., reduce the number of) fraudulent transactions, reduce losses due to fraudulent transactions, and thus improve the merchant's security vulnerability score.

At 230, the security vulnerability score is regenerated for the merchant. Specifically, the security vulnerability score is regenerated after (e.g., 6 weeks after, 6 months after, 1 year after, etc.) the merchant has implemented one or more of the patches in the report. Like at 210, regenerating the security vulnerability score may include determining security vulnerabilities and correlations values based on completed transaction records for transactions of the merchant executed after the implementation of the one or more patches. Like at 215, regenerating the security vulnerability score may also include obtaining financial impact values for the security vulnerabilities and calculating a weighted average of the financial impact values using the correlation values as weights.

As discussed above, for the top security vulnerability or for a combination of security vulnerabilities, there may be multiple patches. The patch with the highest rank for the security vulnerability (or combination of security vulnerabilities) was identified at 220. If the regenerated security vulnerability score is higher than the security vulnerability score generated at 215, this indicates that the highest ranked patch might not be the most effective patch to mitigate the security vulnerability (or combination of security vulnerabilities). In other words, the ranking is incorrect.

At 235, in response to a higher security vulnerability score, the ranking of patches associated with the top security vulnerability (or combination of security vulnerabilities) from 220 is revised. Assume there exist three patches (patch A, patch B, patch C) for the top security vulnerability (or combination of security vulnerabilities) from 220. In this example, rank (patch X) means the rank of patch X. Also assume that prior to 230, rank (patch A)>rank (patch B)>rank (patch C). Accordingly, due to the ranking, the report in 225 included patch A and the merchant implemented patch A. If the regenerated security vulnerability score for the merchant is higher than the security vulnerability score generated in 215, this indicates that patch A might not be the most effective tool for mitigating the top security vulnerability (or combination of security vulnerabilities). Accordingly, the ranking for patches A, B, and C may be revised. For example, revised rank (patch B)>revised rank (patch C)>revised rank (patch A). As another example, revised rank (patch B)>revised rank (patch A)>revised rank (patch C). Such revisions may be fed back into the machine learning model for analysis of future transactions and future identification of patches. In other words, these revisions would be used to continue to train the model and the revised ranks would emerge during the next generation of ranks.

Those skilled in the art, having the benefit of this detailed description, will appreciate that regenerating the security vulnerability score following implementation of the patch is effectively a feedback mechanism for revising the patch rankings. 230 and 235 may be repeated multiple times following implementation of a patch by the merchant.

Although not shown in FIG. 2, the security vulnerabilities and their correlation values at either 210 or 230 may be transmitted to card processor 150 (e.g., credit card processor) utilized by the merchant. Although card processor 150 already has an internal detection model (e.g., fraud detection model 155) for detecting and preventing fraudulent transactions, the security vulnerabilities and their correlation values may be used by card processor 150 to update (e.g., refine) fraud detection model 155.

Figure 3:
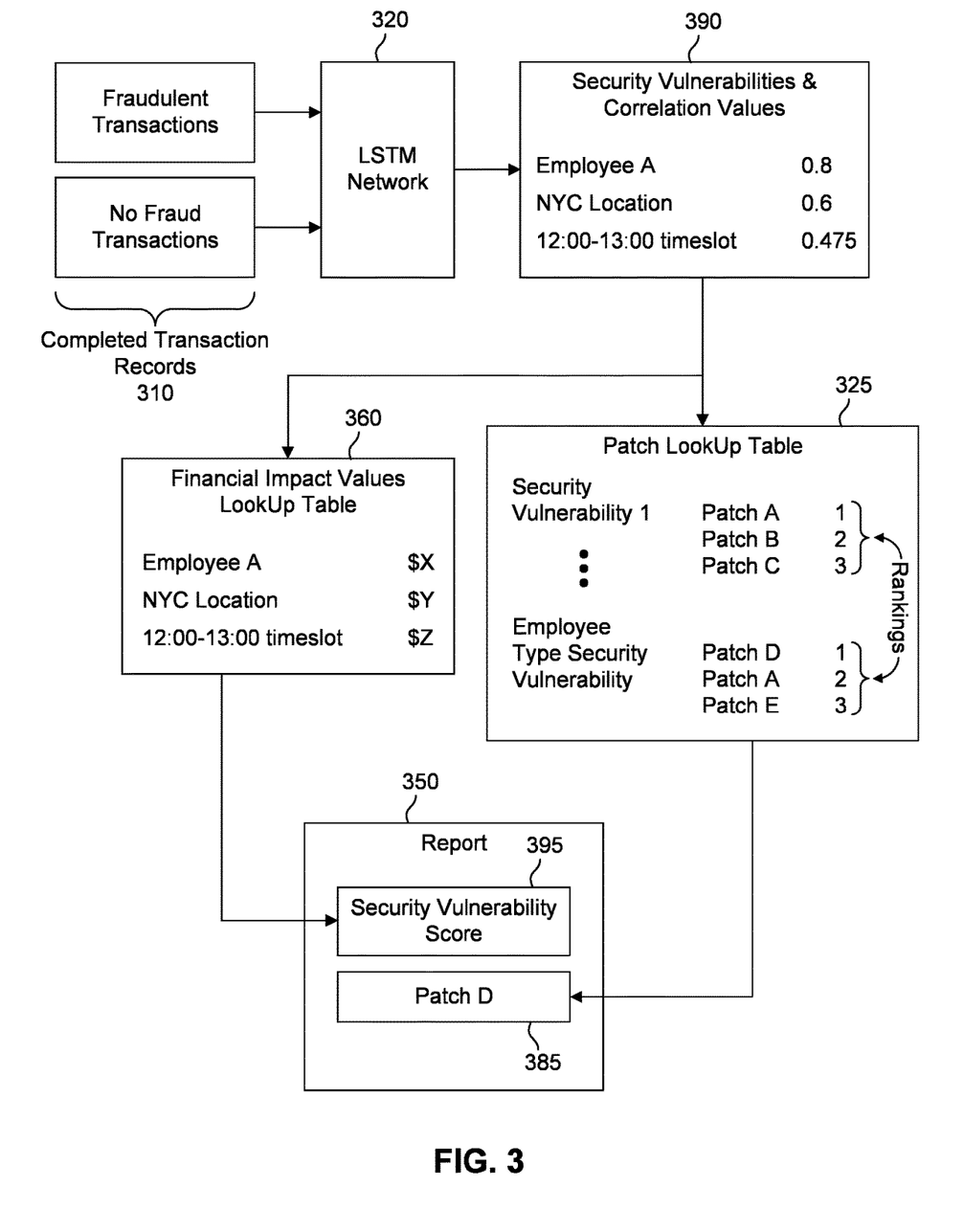
FIG. 3 shows an example of process corruption prevention (e.g., fraud prevention) in accordance with one or more embodiments.

FIG. 3 shows an example of process corruption prevention (e.g., transaction fraud prevention) in accordance with one or more embodiments. In one or more embodiments, a completed transaction record is an example of a processed record, a merchant is an example of an entity, a financial impact value is an example of an impact value, and an employee is an example of a user.

As shown in FIG. 3, completed transaction records 310 involving a merchant are applied to an LSTM network 320. Completed transaction records 310 are essentially the same as completed transaction record 110, discussed above in reference to FIG. 1. Accordingly, each of the completed transaction records 310 include one or more of a customer ID, a list of the one or more items purchased by the customer during the transaction, an employee ID, a store location ID, a timestamp with the date and time of the transaction, a fraud indicator for the transaction, etc. The fraud indicator distinguishes completed transaction records of fraudulent transactions from completed transaction records of transactions that are not suspected of being fraudulent.

The LSTM network 320 consumes the completed transaction records 310 and outputs security vulnerabilities and correlation values for the security vulnerabilities 390. Each of the security vulnerabilities is linked to fraudulent activity (e.g., fraudulent transactions) for the merchant. Each correlation value quantifies the relationship strength between a security vulnerability and fraudulent activity (e.g., fraudulent transactions) for the merchant. In FIG. 3, employee A of the merchant, the NYC location of the merchant, and the 12:00-13:00 time window are identified as security vulnerabilities for the merchant by LSTM network 320. Further, employee A of the merchant has the largest correlation value, while the 12:00-13:00 time window has a smaller correlation value. This implies that while both employee A and the 12:00-13:00 time window are correlated with fraudulent transactions, employee A is more tightly correlated with the fraudulent transactions and thus is the top security vulnerability.

The example in FIG. 3 includes a financial impact values lookup table 360. This lookup table may be essentially the same as financial impact value lookup table 160, discussed above in reference to FIG. 1. Each entry in the lookup table 360 includes a security vulnerability and a financial impact value of the security vulnerability (i.e., a revenue amount of the merchant attributable to the security vulnerability). For example, $X of revenue of the merchant is attributable to employee A, while $Y of revenue of the merchant is attributable to the NYC location. These financial impact values are retrieved from the lookup table 360 by searching lookup table 360 using the security vulnerabilities 390. Further, a security vulnerability score 395 for the merchant may be calculated as a weighted average of the financial impact values using the correlation values as weights. In this example, the security vulnerability score 395 may be calculated as: ($X*0.8+$Y*0.6+$Z*0.475)/3.

The example in FIG. 3 also includes a patch lookup table 325. Patch lookup table 325 may be essentially the same as patch lookup table 125, discussed above in reference to FIG. 1. Each entry in patch lookup table 325 includes a security vulnerability (or a type of security vulnerability) and one or more patches for mitigating the security vulnerability (or type of security vulnerability). For example, as shown in FIG. 3, patch A, patch B, and/or patch C may be used to mitigate security vulnerability 1. As another example, patch D, patch A, and/or patch E may be used to mitigate an employee type security vulnerability.

As also shown in FIG. 3, there is a ranking associated with the patches. In the case of security vulnerability 1, patch A has the highest ranking while patch C has the lowest ranking. In the case of the employee type security vulnerability, patch D has the highest ranking while patch E has the lowest ranking. The top security vulnerability (i.e., employee A) is an employee type security vulnerability. The top security vulnerability may be used to search the patch lookup table 325. The patch with the highest rank for the employee type security vulnerability (i.e., Patch D 385) may be output by the patch lookup table 325 as the search result.

A report 350 including the security vulnerability score 395 and the retrieved patch 385 may be transmitted to the merchant. The merchant may implement the retrieved patch 385 in an attempt to mitigate the security vulnerability (in this example, employee A) and thus reduce the likelihood of fraudulent transactions resulting from employee A, in turn lowering the security vulnerability score.

Figure 4:
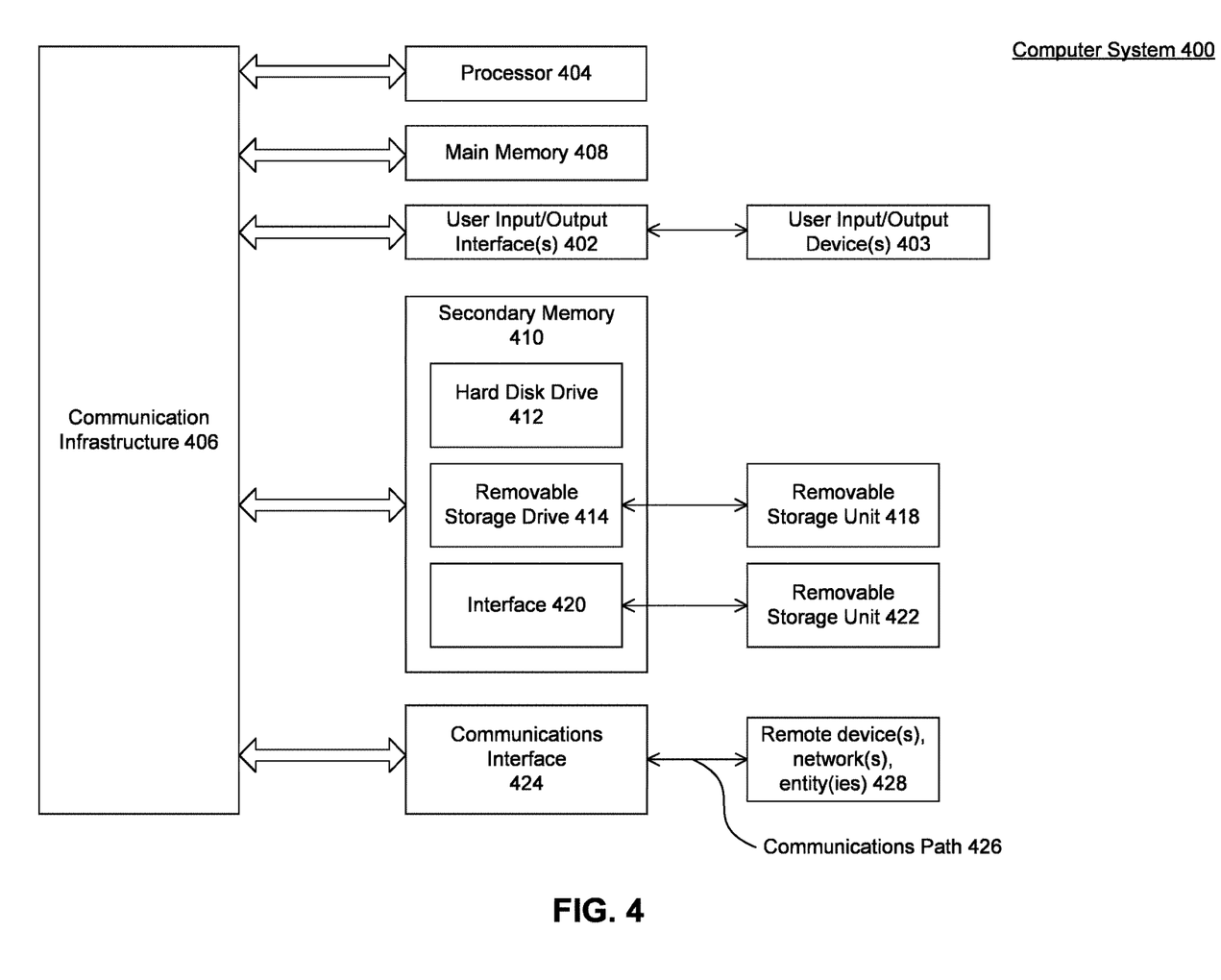
FIG. 4 shows a computer system in accordance with one or more embodiments.

Various embodiments can be implemented, for example, using one or more computer systems, such as computer system 400 shown in FIG. 4. Computer system 400 can be used, for example, to implement the processes shown in FIG. 2 and FIG. 3. Computer system 400 can also be used to implement the components in FIG. 1. Computer system 400 can be any computer capable of performing the functions described herein.

Computer system 400 includes one or more processors (also called central processing units, or CPUs), such as a processor 404. Processor 404 is connected to a communication infrastructure 406 or bus.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 reads from and/or writes to removable storage unit 418 in a well-known manner.

According to an example embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method of process corruption prevention, comprising:
   storing, by one or more computing devices, a first plurality of processed records associated with an entity in a repository, wherein each of the first plurality of processed records includes a fraud indicator determined by a fraud detection model that classifies a completed transaction as confirmed fraudulent, suspected fraudulent, or not fraudulent;
   determining, by the one or more computing devices, a first plurality of security vulnerabilities for the entity and a first plurality of correlation values for the first plurality of security vulnerabilities by applying a machine learning model to the first plurality of processed records, wherein each of the first plurality of correlation values quantifies a relationship strength between a security vulnerability and a fraudulent activity;
   generating, by the one or more computing devices, a first security vulnerability score for the entity using the first plurality of correlation values;
   identifying, by the one or more computing devices, a security vulnerability having a greatest correlation value from the first plurality of security vulnerabilities;
   implementing, by the one or more computing devices, a patch to mitigate one or more security vulnerabilities of the first plurality of security vulnerabilities, wherein the patch is selected from a plurality of patches in a patch lookup table using the security vulnerability having the greatest correlation value;
   determining, by the one or more computing devices, based in part on the implementing the patch for a predefined time period, a change in the first security vulnerability score, wherein the predefined time period is determined based on the security vulnerability having the greatest correlation value; and
   implementing, by the one or more computing devices, based on determining the change in the first security vulnerability score, a different patch selected from the plurality of patches.

2. The method of claim 1, wherein generating the first security vulnerability score comprises:
   obtaining, by the one or more computing devices, a first plurality of impact values for the first plurality of security vulnerabilities, wherein each of the first plurality of impact values is a revenue amount of the entity attributable to one of the first plurality of security vulnerabilities; and calculating, by the one or more computing devices, a weighted average based on the first plurality of impact values and the first plurality of correlation values.

3. The method of claim 1, further comprising:

transmitting, by the one or more computing devices, the first plurality of security vulnerabilities and the first plurality of correlation values to a processor, wherein the processor updates the fraud detection model based on the first plurality of security vulnerabilities and the first plurality of correlation values.

4. The method of claim 1, wherein the first plurality of security vulnerabilities comprises a user identifier (ID), and wherein the patch for the security vulnerability having the greatest correlation value comprises enforcing user logouts from user devices.

5. The method of claim 1, further comprising:

issuing, by the one or more computing devices, a report to the entity, wherein the report comprises at least one of the first plurality of security vulnerabilities, the first plurality of correlation values for the first plurality of security vulnerabilities, the first security vulnerability score, the patch, and an average or median security vulnerability score for other entities similar to the entity receiving the report.

6. A system for process corruption prevention, comprising:

a memory; and a computer processor coupled to the memory and configured to:

store a first plurality of processed records associated with an entity in a repository, wherein each of the first plurality of processed records includes a fraud indicator determined by a fraud detection model that classifies a completed transaction as confirmed fraudulent, suspected fraudulent, or not fraudulent;

determine a first plurality of security vulnerabilities for the entity and a first plurality of correlation values for the first plurality of security vulnerabilities by applying a machine learning model to the first plurality of processed records, wherein each of the first plurality of correlation values quantifies a relationship strength between a security vulnerability and a fraudulent activity;

generate a first security vulnerability score for the entity using the first plurality of correlation values;

identify a security vulnerability having a greatest correlation value from the first plurality of security vulnerabilities;

implement a patch to mitigate one or more security vulnerabilities of the first plurality of security vulnerabilities, wherein the patch is selected from a plurality of patches in a patch lookup table using the security vulnerability having the greatest correlation value;

determine, based in part on the implementing the patch for a predefined time period, a change in the first security vulnerability score, wherein the predefined time period is determined based on the security vulnerability having the greatest correlation value; and implement based on determining the change in the first security vulnerability score, a different patch selected from the plurality of patches.

7. The system of claim 6, wherein the computer processor generates the first security vulnerability score by:

obtaining a first plurality of impact values for the first plurality of security vulnerabilities, wherein each of the first plurality of impact values is a revenue amount of the entity attributable to one of the first plurality of security vulnerabilities; and calculating a weighted average based on the first plurality of impact values and the first plurality of correlation values.

8. The system of claim 6, wherein the first plurality of security vulnerabilities comprises a user identifier (ID), and wherein the patch for the security vulnerability having the greatest correlation value comprises enforcing user logouts from user devices.

9. The system of claim 6, wherein the computer processor is further configured to:

update the fraud detection model based on the first plurality of security vulnerabilities and the first plurality of correlation values.

10. The system of claim 6, wherein the computer processor is further configured to:

issue a report to the entity, wherein the report comprises at least one of the first plurality of security vulnerabilities, the first plurality of correlation values for the first plurality of security vulnerabilities, the first security vulnerability score, the patch, and an average or median security vulnerability score for other entities similar to the entity receiving the report.

11. A non-transitory computer-readable medium having instructions stored thereon that, when executed by at least one computing device, cause the at least one computing device to perform operations comprising:

storing a first plurality of processed records associated with an entity in a repository, wherein each of the first plurality of processed records includes a fraud indicator determined by a fraud detection model that classifies a completed transaction as confirmed fraudulent, suspected fraudulent, or not fraudulent;

determining a first plurality of security vulnerabilities for the entity and a first plurality of correlation values for the first plurality of security vulnerabilities by applying a machine learning model to the first plurality of processed records, wherein each of the first plurality of correlation values quantifies a relationship strength between a security vulnerability and a fraudulent activity;

generating a first security vulnerability score for the entity using the first plurality of correlation values;

identifying a security vulnerability having a greatest correlation value from the first plurality of security vulnerabilities;

implementing a patch to mitigate one or more security vulnerabilities of the first plurality of security vulnerabilities, wherein the patch is selected from a plurality of patches in a patch lookup table using the security vulnerability having the greatest correlation value;

determining, based in part on the implementing the patch for a predefined time period, a change in the first security vulnerability score, wherein the predefined time period is determined based on the security vulnerability having the greatest correlation value; and implementing based on determining the change in the first security vulnerability score, a different patch selected from the plurality of patches.

12. The non-transitory computer-readable medium of claim 11, wherein generating the first security vulnerability score comprises:

obtaining a first plurality of impact values for the first plurality of security vulnerabilities, wherein each of the first plurality of impact values is a revenue amount of the entity attributable to one of the first plurality of security vulnerabilities; and calculating a weighted average based on the first plurality of impact values and the first plurality of correlation values.

13. The non-transitory computer-readable medium of claim 11, wherein the first plurality of security vulnerabilities comprises a user identifier (ID), and wherein the patch for the security vulnerability having the greatest correlation value comprises enforcing user logouts from user devices.

14. The non-transitory computer-readable medium of claim 11, the operations further comprising:

issuing a report to the entity, wherein the report comprises at least one of the first plurality of security vulnerabilities, the first plurality of correlation values for the first plurality of security vulnerabilities, the first security vulnerability score, the patch, and an average or median security vulnerability score for other entities similar to the entity receiving the report.

15. The non-transitory computer-readable medium of claim 11, the operations further comprising:

transmitting the first plurality of security vulnerabilities and the first plurality of correlation values to a processor, wherein the processor updates the fraud detection model based on the first plurality of security vulnerabilities and the first plurality of correlation values.

16. The method of claim 1, further comprising:

storing, by the one or more computing devices, a second plurality of processed records associated with the entity in the repository;

determining, by the one or more computing devices, a second plurality of security vulnerabilities for the entity and a second plurality of correlation values for the second plurality of security vulnerabilities by applying the second plurality of processed records to the machine learning model;

obtaining, by the one or more computing devices, a second plurality of impact values for the second plurality of security vulnerabilities;

generating, by the one or more computing devices, a second security vulnerability score for the entity using the second plurality of correlation values and the second plurality of impact values; and in response to determining that the second security vulnerability score is greater than the first security vulnerability score, updating, by the one or more computing devices, rankings for the plurality of patches in the patch lookup table.

17. The method of claim 16, further comprising:

training, by the one or more computing devices, the machine learning model using the updated rankings for the plurality of patches in the patch lookup table.

18. The system of claim 6, wherein the computer processor is further configured to:

store a second plurality of processed records associated with the entity in the repository;

determine a second plurality of security vulnerabilities for the entity and a second plurality of correlation values for the second plurality of security vulnerabilities by applying the second plurality of processed records to the machine learning model;

obtain a second plurality of impact values for the second plurality of security vulnerabilities;

generate a second security vulnerability score for the entity using the second plurality of correlation values and the second plurality of impact values; and in response to determining that the second security vulnerability score is greater than the first security vulnerability score, update rankings for the plurality of patches in the patch lookup table.

19. The system of claim 18, wherein the computer processor is further configured to:

train the machine learning model using the updated rankings for the plurality of patches in the patch lookup table.

20. The non-transitory computer-readable medium of claim 11, the operations further comprising:

storing a second plurality of processed records associated with the entity in the repository;

determining a second plurality of security vulnerabilities for the entity and a second plurality of correlation values for the second plurality of security vulnerabilities by applying the second plurality of processed records to the machine learning model;

obtaining a second plurality of impact values for the second plurality of security vulnerabilities;

generating a second security vulnerability score for the entity using the second plurality of correlation values and the second plurality of impact values; and in response to determining that the second security vulnerability score is greater than the first security vulnerability score, updating rankings for the plurality of patches in the patch lookup table.

* * * * *